United States Patent [19]

Freedman et al.

[11] Patent Number: 5,451,873
[45] Date of Patent: Sep. 19, 1995

[54] METHOD AND APPARATUS FOR DETERMINING THE IN SITU LARMOR FREQUENCY OF A WELLBORE NMR TOOL TO COMPENSATE FOR ACCUMULATION OF MAGNETIC MATERIAL ON THE MAGNET HOUSING OF THE TOOL

[75] Inventors: Robert Freedman; John E. Smaardyk; Jason P. MacInnis, all of Houston, Tex.

[73] Assignee: Schlumberger Technology Corporation, Houston, Tex.

[21] Appl. No.: 131,644

[22] Filed: Oct. 5, 1993

[51] Int. Cl.⁶ .............................................. G01V 3/00
[52] U.S. Cl. ...................................... 324/303; 324/322
[58] Field of Search ............... 324/300, 303, 307, 309, 324/318, 322

[56] References Cited

U.S. PATENT DOCUMENTS

| | | | |
|---|---|---|---|
| 4,827,219 | 5/1989 | Harrison | 324/322 |
| 4,837,516 | 6/1989 | Takahashi | 324/322 |
| 4,855,680 | 8/1989 | Arakawa et al. | 324/322 |
| 5,055,787 | 10/1991 | Kleinberg et al. | 324/303 |

FOREIGN PATENT DOCUMENTS

WO92/10768A1  6/1992  WIPO .

*Primary Examiner*—Louis M. Arana
*Attorney, Agent, or Firm*—Henry N. Garrana; John H. Bourchard

[57] ABSTRACT

A system includes a wellbore tool disposed in a wellbore and a surface apparatus disposed at a surface of the wellbore. Prior to operating the tool to take an initial measurement, the wellbore tool is first calibrated to take into account magnetic junk which is magnetically attracted to and accumulated on a magnet housing of the tool. To calibrate the tool, a new tuning frequency, called the Larmor frequency, is determined, and the tool is tuned to the new Larmor frequency before taking an initial measurement. The wellbore tool and the surface apparatus each include a processing system. Each processing system includes a memory. A first part of a tuning frequency determination software is stored in the memory of the tool, and a second part of the frequency determination software is stored in the memory of the surface apparatus. To determine the tuning frequency, the processing system in the wellbore tool initiates execution of the first part of the tuning frequency determination software. Results from this first execution are transmitted uphole to the surface apparatus. The processing system in the surface apparatus then initiates execution of the second part of the tuning frequency determination software. When this second execution is complete, the new tuning frequency, known as the Larmor frequency, is determined. The wellbore tool is then tuned to the new Larmor frequency.

22 Claims, 5 Drawing Sheets

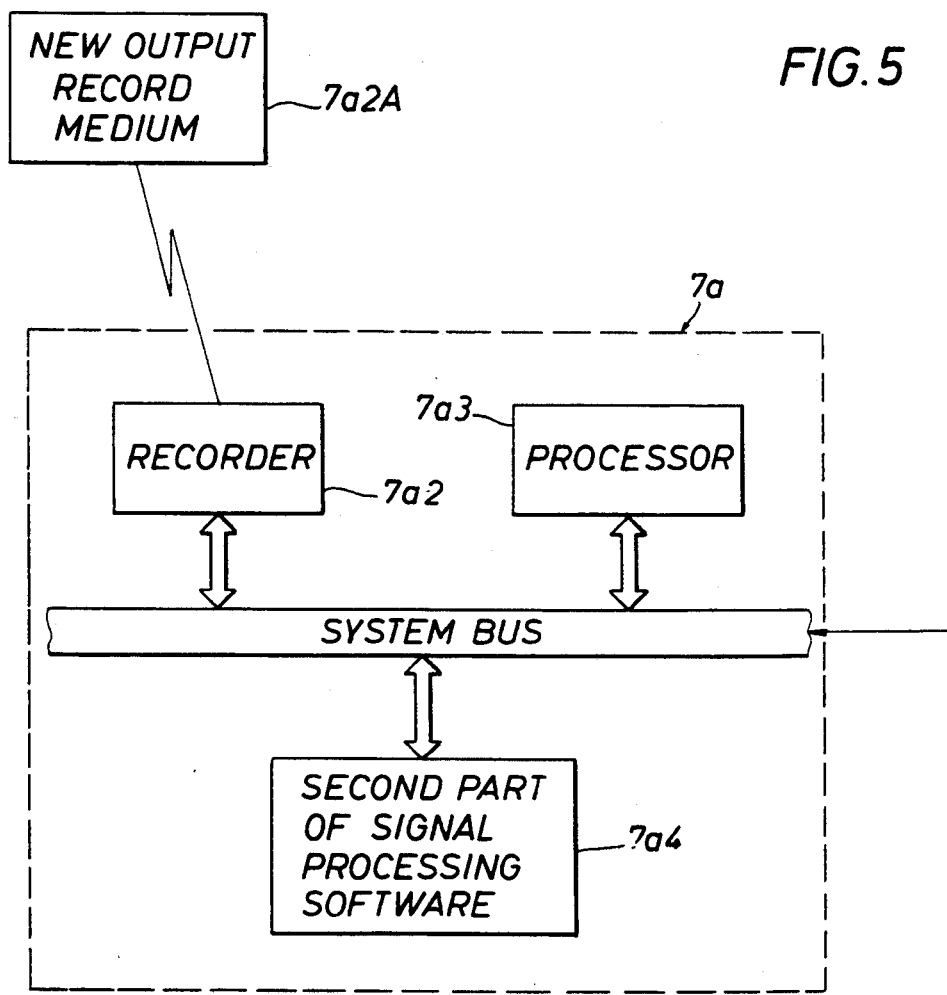
FIG.5
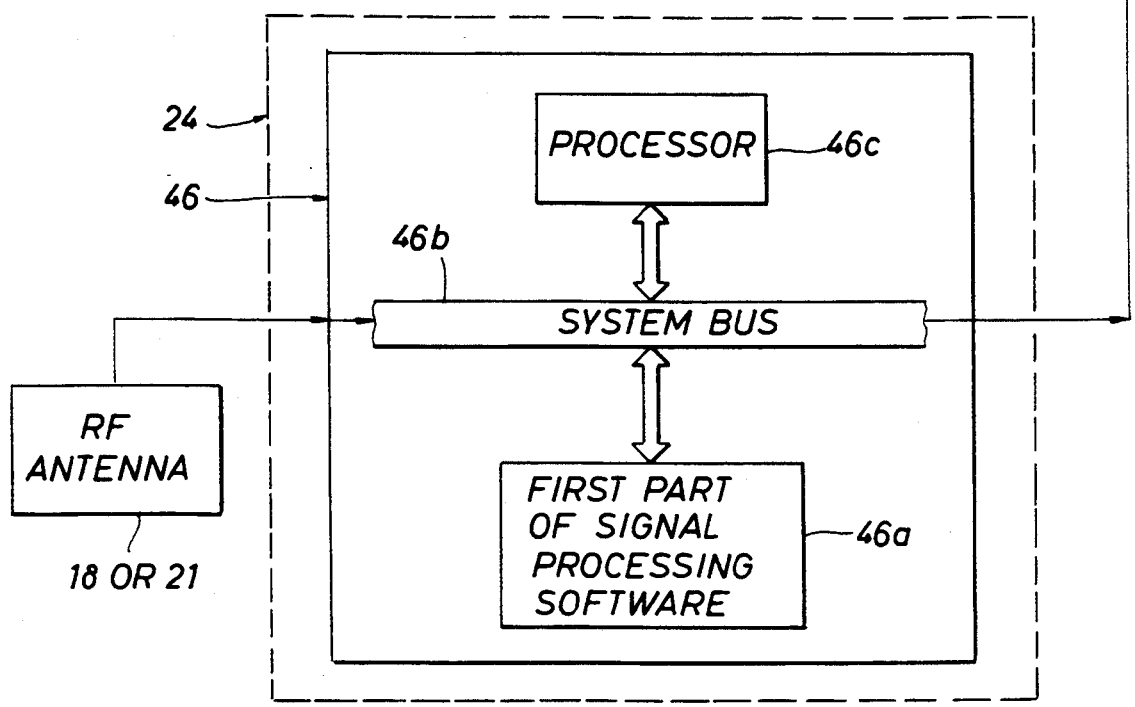

METHOD AND APPARATUS FOR DETERMINING THE IN SITU LARMOR FREQUENCY OF A WELLBORE NMR TOOL TO COMPENSATE FOR ACCUMULATION OF MAGNETIC MATERIAL ON THE MAGNET HOUSING OF THE TOOL

BACKGROUND OF THE INVENTION

The subject matter of the present invention relates to a new method and apparatus associated with a Combinable Magnetic Resonance Tool (CMRT) adapted to be disposed in a wellbore for determining the Larmor frequency of the tool in the borehole prior to the use of the tool for logging operations.

Various logging tools adapted to be disposed in a wellbore utilize the principles of nuclear magnetic resonance. One such tool is known as the Combinable Magnetic Resonance Tool (CMRT), also known as the Pulsed Nuclear Magnetism Tool (PNMT). The CMRT tool is described in detail in the following two prior pending patent applications, the disclosures of which are incorporated by reference into the specification of this application: (1) application Ser. No. 07/970,324, filed Nov. 02, 1992, entitled "Borehole Measurement of NMR Characteristics of Earth Formations" by Jason P. Macinnis et al, and (2) application Ser. No. 07/970,332, filed Nov. 02, 1992, entitled "Processing Method and Apparatus for Processing Spin Echo Inphase and Quadrature Amplitudes from a Pulsed Nuclear Magnetism Tool and Producing new Output Data to be Recorded on an Output Record" by Robert Freedman now U.S. Pat. No. 5,291,137. The CMRT tool includes a magnet housing for enclosing a magnet array. The magnet array produces a static magnetic field B0 in the earth formations adjacent to the tool. A nearby antenna produces an oscillating radio frequency magnetic field B1 which is nearly perpendicular to the static magnetic field B0, is focused into a formation traversed by the wellbore, and is superimposed on the static field B0 within the formation disposed opposite the magnetic housing. The frequency of the B1 field is variable so that the tool can be tuned over a wide frequency interval. The CMRT tool makes a measurement in the formation by magnetically reorienting the nuclear spins of particles in the formation with pulses of the magnetic field B1 and then detecting, via the antenna, the precession of the tipped particles in the static magnetic field B0 within the formation. A series of results are then transmitted uphole for processing in a well truck computer.

However, during the measurement, magnetic particles disposed in the wellbore (or "junk"), potentially resulting from the original drilling of the wellbore, are magnetically attracted to and accumulate on the magnet housing which encloses the magnet array. This accumulation of junk on the magnet housing causes an error to be inherently incorporated into the results of the measurement. As a result, when the results of the measurement are transmitted uphole, erroneous results are recorded on an output record medium.

As a result, a method and apparatus is needed for calibrating or tuning the CMRT tool prior to taking a measurement when the tool is disposed in the wellbore, the calibration or tuning procedure being designed to take into account the accumulation of the magnetic junk on the magnet housing of the CMRT tool.

SUMMARY OF THE INVENTION

Accordingly, it is a primary object of the present invention to provide a method and apparatus for tuning or calibrating a wellbore tool disposed in a wellbore prior to operating the tool and taking a measurement.

It is a further object of the present invention to provide a system including a wellbore apparatus adapted to be disposed in s wellbore and surface apparatus adapted to be disposed at a surface of the wellbore for collectively determining a new tuning frequency, called a Larmor frequency, which takes into account the accumulation of junk on a magnet housing of the wellbore apparatus, and for tuning the wellbore apparatus to the new Larmor frequency prior to operating the wellbore apparatus and taking an initial measurement.

It is a further object of the present invention to provide a system including a wellbore apparatus adapted to be disposed in a wellbore and surface apparatus adapted to be disposed at a surface of the wellbore for collectively determining a new tuning frequency, called a Larmor frequency, which takes into account the accumulation of junk on a magnet housing of the wellbore apparatus, the wellbore apparatus including a first processing apparatus which includes a memory that stores a first part of a tuning frequency determination software, the surface apparatus including a second processing apparatus which includes a memory that stores a second part of the tuning frequency determination software, the first and second parts of the tuning frequency determination software, in conjunction with the first and second processing apparatus, determining the Lamaor frequency, the wellbore apparatus being tuned to the Larmor frequency, by adjusting the capacitance of the CMRT antenna(s), prior to operating the wellbore apparatus and taking an initial measurement.

In accordance with these and other objects of the present invention, when a combinable magnetic resonance tool (CMRT tool), also known as a pulsed nuclear magnetism tool (PNMT tool), is disposed in a wellbore, prior to operating the tool to take an initial measurement, the tool is first calibrated to take into account the magnetic junk disposed in the wellbore which is magnetically attracted to and is accumulated on a magnet housing of the tool. When the tool is first disposed in the wellbore, if the tool is not first calibrated before taking an initial measurement, the magnetic junk accumulated on the magnet housing will cause erroneous results to be obtained by the tool (the tool signal will be attenuated). However, when the tool is calibrated, a new tuning frequency, called the Larmor frequency, is determined. The tool is then tuned to the new Larmor frequency before taking an initial measurement. The tool is tuned to the new Larmor frequency by adjusting the effective capacitance of the antenna(s) of the CMRT tool. The effective capacitance is adjusted by closing or opening certain RF switches in the antenna circuit which has the effect of increasing or decreasing the effective capacitance of the antenna(s). Once tuned to the Larmor frequency, the presence of the magnetic material, which has accumulated on the magnet housing of the tool, is taken into account, and any results obtained from subsequent measurements taken by the tool will be free of any error. It is assumed that the junk accumulation occurs as the tool is lowered into the borehole through surface and/or other strings of casing in the well. During logging, experience has shown that further accumulation of magnetic junk on the magnet housings of the tool does not occur. A good check is to perform a Larmor frequency determination after logging (i.e., before exiting the borehole) or at intervals during logging.

The combinable magnetic resonance tool is a system which includes a wellbore apparatus adapted to be disposed in a wellbore and a surface apparatus adapted to be disposed at a surface of the wellbore. The wellbore apparatus and the surface apparatus each include a processing system. The processing system in the wellbore apparatus includes a first memory which stores a first part of a signal processing software, which software includes a first part of a tuning frequency determination software. The processing system in the surface apparatus includes a second memory which stores a second part of a signal processing software, which software includes a second part of a tuning frequency determination software. Prior to taking a first measurement, the processing system in the wellbore apparatus initiates execution of the first part of the tuning frequency determination software. Results from this first execution are transmitted uphole to the surface apparatus. The processing system in the surface apparatus then initiates execution of the second part of the tuning frequency determination software. When this second execution is complete, a new tuning frequency, known as the Larmor frequency, is determined. The wellbore apparatus is then tuned to the new Larmor frequency. The wellbore apparatus is tuned to the new Larmor frequency by adjusting the effective capacitance of the antenna(s) of the tool. Once this tuning procedure is complete, the wellbore apparatus of the CMRT tool has been calibrated, and the presence of the magnetic "junk" accumulated on the magnet housing of the wellbore apparatus is taken into account.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be [imitative of the present invention, and wherein:

FIG. 5 illustrates the processing systems of the wellbore apparatus electrically connected to the processing system of the surface apparatus of the CMRT tool;

DETAILED DESCRIPTION OF THE PREFERRED EMBODIMENT

Figures 1, 2:
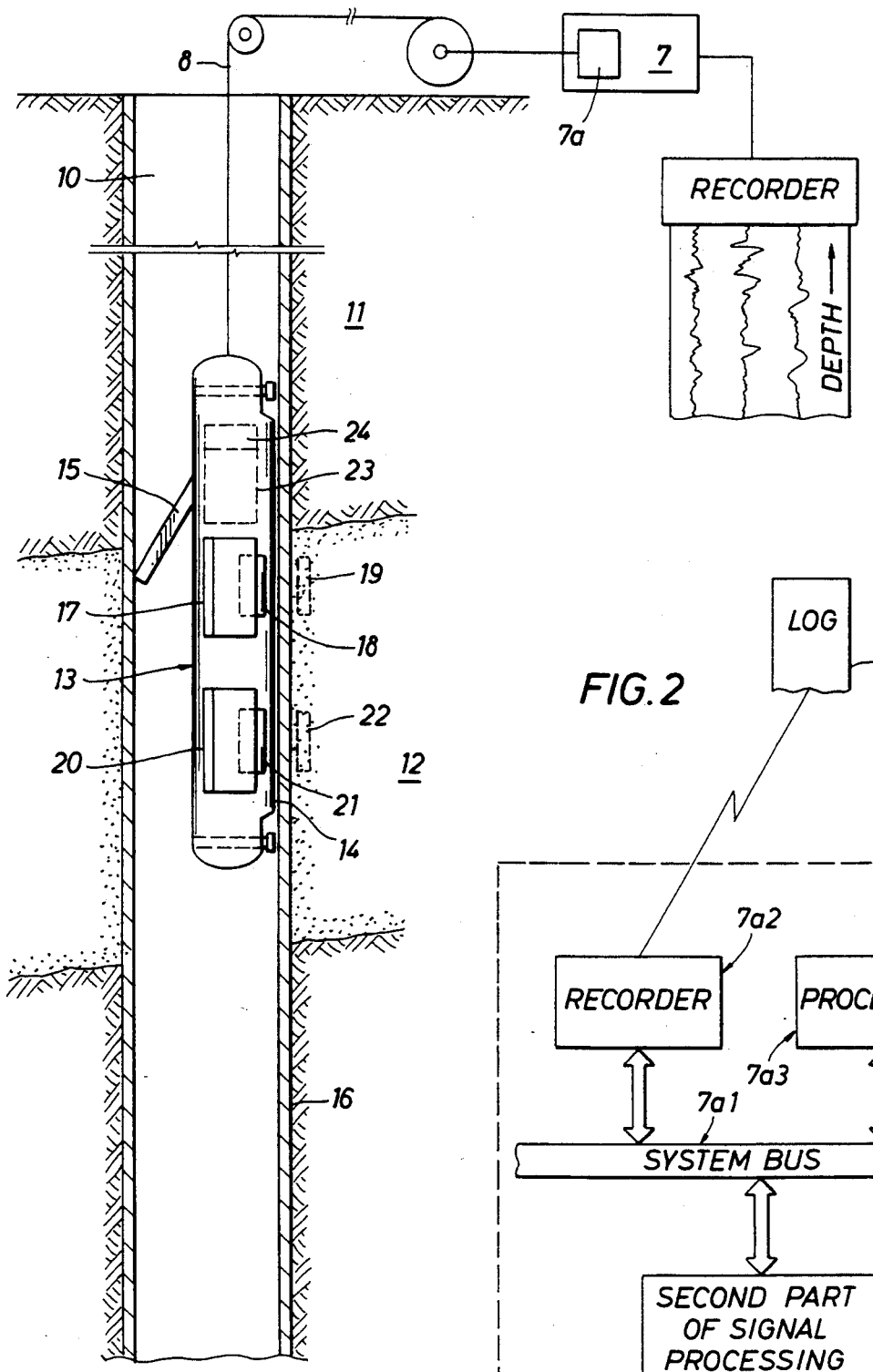
FIG. 1 illustrates a pulsed nuclear magnetism tool including a wellbore apparatus disposed in a wellbore and a surface apparatus electrically connected to the wellbore apparatus disposed on a surface of the wellbore.
FIG. 2 illustrates a processing system of the surface apparatus.

Referring to FIG. 1, a nuclear magnetic resonance (NMR) logging system is illustrated, the NMR logging system including an NMR logging tool (or wellbore apparatus) 13 disposed in a wellbore and a processing system (or surface apparatus) 7a disposed at the wellbore surface for processing signals transmitted uphole by the logging tool. The NMR logging system illustrates two antennas 18 and 21, whereas the aforementioned CMRT tool has one antenna. Otherwise, the NMR logging system of FIG. 1 is identical to the CMRT tool in all other respects.

In FIG. 1, a borehole 10 is shown adjacent to formations 11, 12, the characteristics of which are to be determined. Within borehole 10 there is shown a logging tool 13 connected via a wireline 8 to surface equipment 7. The surface equipment 7 includes a processing system 7a which stores therein a signal processing method and apparatus embodied in the form of software. The processing system 7a will be discussed in more detail with reference to FIG. 2 of the drawings. Tool 13 preferably has a face 14 shaped to intimately contact the borehole wall, with minimal gaps or standoff. The tool 13 may have a retractable arm 15 which can be activated to press the body of the tool 13 against the borehole wall during a logging run, with the face 14 pressed against the wall's surface. Although tool 13 is shown in the preferred embodiment of FIG. 1 as a single body, the tool may obviously comprise separate components such as a cartridge, sonde or skid, and the tool may be combinable with other logging tools as would be obvious to those skilled in the art. Similarly, although wireline 8 is the preferred form of physical support and communicating link for the invention, alternatives are clearly possible, and the invention can be incorporated in a drill stem, for example, using forms of telemetry which may not require a wireline. The formations 11, 12 have distinct characteristics such as formation type, porosity, permeability and oil content, which can be determined from measurements taken by the tool. Deposited upon the borehole wall of formations 11, 12 is typically a layer of mudcake 16 which is deposited thereon by the natural infiltration of borehole fluid filtrate into the formations. In the preferred embodiment shown in FIG. 1, tool 13 comprises a first set magnet array 17 and an antenna 18 positioned between the array 17 and the wall engaging face 14. Magnet array 17 produces a static magnetic field B0 in all regions surrounding the tool 13. The antenna 18 produces, at selected times, an oscillating radio frequency magnetic field B1 which is focussed into formation 12, and is superposed on the static field B0 within those parts of formation opposite the face 14. The field B1 is perpendicular to the field B0. The Volume of Investigation, 19, of the tool for the first set magnet array 17 shown in dotted lines FIG. 1, is a vertically elongated region directly in front of tool face 14 in which the magnetic field produced by the magnet array 17 is substantially homogeneous and the spatial gradient thereof is weak. The tool 13 may also comprise, as an option, a second set magnet array 20 and an antenna 21 positioned between the array 20 and the wall engaging face 14. Magnet array 20 produces another static magnetic field B0 in all regions surrounding the tool 13. The antenna 21 produces, at selected times, an oscillating radio frequency magnetic field B1 which is again focussed into formation 12, and is superposed on the static field B0 within those parts of formation opposite the face 14. The Volume of Investigation 22 of the tool for the second set magnet array 20, shown in dotted lines in FIG. 1, is a vertically elongated region directly in front of tool face 14 in which the magnetic field produced by the magnet array 20 is substantially homogeneous and the spatial gradient thereof is approximately zero. Due to the particular magnet arrangement for the second set magnet array 20, the Volume of Investigation 22 is at a depth in the formation 12 which is greater than the depth at which the Volume of Investigation 19 is located. A prepolarizing magnet 23, shown in dotted lines, may be positioned directly above the array 17. An electronics cartridge 24 is positioned above the magnet 23. The electronics cartridge 24 includes a downhole microcomputer. The electronics cartridge 24, including the downhole microcomputer, will be discussed in more detail with reference to FIGS. 3 and 4 of the drawings.

In operation, referring to FIG. 1, the tool 13 makes a measurement in the Volume of Investigation 19 by magnetically reorienting the nuclear spins of particles in formation 12 with a pulse of oscillating magnetic field B1, and then detecting the precession of the tipped particles in the static, homogeneous field B0 within the Volume of investigation 19, over a period of time. As seen in FIG. 1, this Volume of Investigation does not overlap the surface of the wall engaging face 14 as in some previous logging tools, and does not overlap the mudcake 16 on the borehole wall. In a pulse echo type of measurement, a pulse of RF current is passed through the antenna 18 to generate a pulse of RF field B1 where the RF frequency is selected to resonate only hydrogen nuclei subjected to a static magnetic field strength equal or nearly equal to the field B0 within the Volume of Investigation 19. The signals induced in antenna 18 subsequent to the RF pulse B1 represent a measurement of nuclear magnetic precession and decay within the Volume, automatically excluding any undesirable contributions from the borehole fluid, mudcake, or surrounding formations where the field strength of B0 is substantially different. The tool 13 makes a measurement in the Volume of Investigation 22 in the same manner discussed above with respect to the Volume of Investigation 19 but utilizing the second set magnet array 20 and the antenna 21.

In FIG. 2, the computer 7a includes a system bus 7a1, a processor 7a3 connected to the system bus 7a1 for generating output data, a memory 7a4 connected to the system bus 7a1 for storing a second part of the signal processing software, and a recorder 7a2 connected to the system bus for receiving the output data from the processor and generating an output record medium 7a2A. The computer 7a may include or consist of any one of the following computer systems manufactured by Digital Equipment Corporation (DEC), Maynard, Mass.: (1) DEC VAX 6430, (2) DEC PDP-11, or (3) DEC Vaxstation 3100, or it may include any other suitable computer system.

Figure 3:
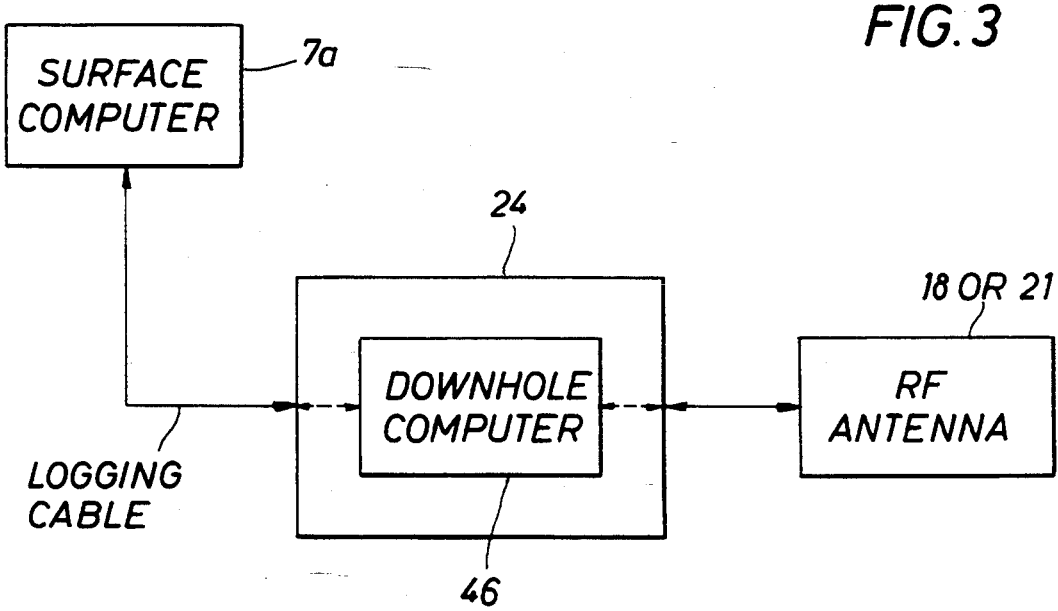
FIGS. 3-4 illustrate a processing system of the wellbore apparatus.
Figure 4:
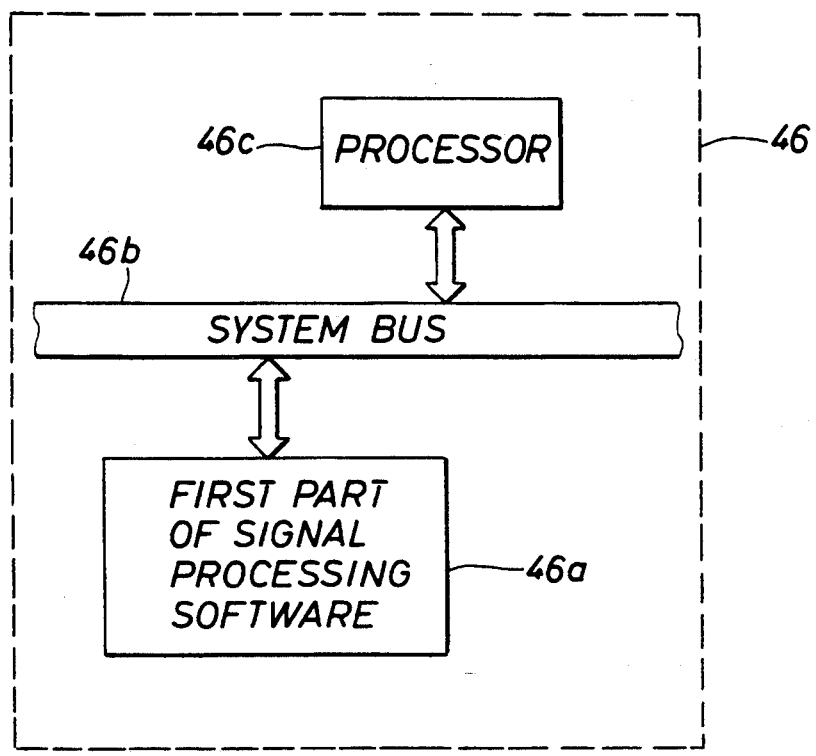

Referring to FIGS. 3 and 4, a construction of the electronics cartridge 24 of FIG. 1 is illustrated. A more detailed construction of the hardware associated with the NMR logging system of FIGS. 1, and in particular, of the construction of the electronics cartridge 24, is set forth in a prior pending application Ser. No. 07/970,324, filed Nov. 02, 1992, entitled "Borehole Measurement of NMR Characteristics of Earth Formations", the disclosure of which has already been incorporated by reference into this specification.

In FIG. 3, the surface computer 7a is electrically connected via logging cable to the electronics cartridge 24 of FIG. 1. The electronics cartridge 24 includes a downhole computer 46. The downhole computer 46 is ultimately electrically connected to the antennas 18 and 21.

In FIG. 4, the downhole computer 46 of electronics cartridge 24 includes a system bus 46b to which a processor 46c is electrically connected and a memory 46a is electrically connected. The memory 46a stores a first part of the signal processing software.

Referring to FIG. 5, the surface computer 7a is shown electrically connected to and responsive to an output from the downhole computer 46. The downhole computer 46 executes the first part of signal processing software, including the first part of the tuning frequency determination software, and transmits the results to the surface computer 7a. The surface computer 7a executes the second part of signal processing software, including the second part of the tuning frequency determination software, and ultimately determines a new tuning frequency, known as the Larmor frequency. The wellbore apparatus 13 of FIG. 1 is then tuned to the new Larmor frequency. When tuned to the new Larmor frequency, the wellbore apparatus 13 of FIG. 1 is calibrated. When calibrated, the wellbore apparatus 13 in FIG. 1 takes into account the magnetic junk which has accumulated on the magnet housings 17 and 20 in FIG. 1. When any subsequent measurements are made using the wellbore apparatus 13 of FIG. 1, the results of such measurements will not inherently include any errors resulting from the accumulation of the magnetic junk on the magnet housings.

Figure 6:
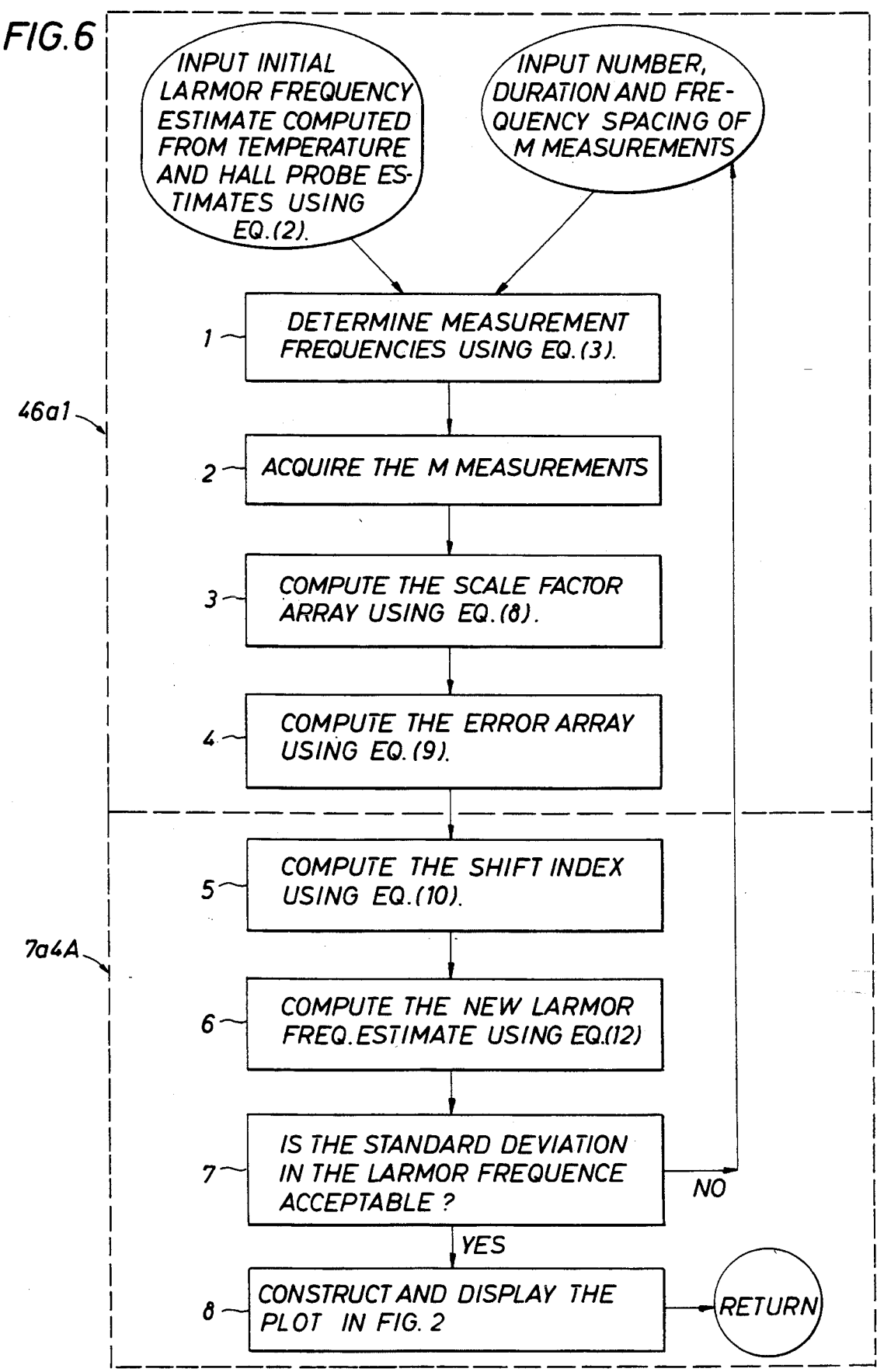
FIG. 6 illustrates a flow chart of the first and second parts of the Larmor frequency determination software which is stored in the memories of the processing systems of the wellbore apparatus and the surface apparatus of the CMRT tool.

Referring to FIG. 6, the tuning frequency determination software, stored in memories 46a and 7a4 of FIG. 5, for determining the new Larmor frequency, is illustrated.

In FIG. 6, the tuning frequency determination software includes a first part 46a1 stored in memory 46a of the downhole computer 46 and a second part 7a4A stored in memory 7a4 of the surface computer 7a. The first part 46a1 of the tuning frequency determination software has four parts:

1. Determine measurement frequencies using equation (3) in response to (1) initial Larmor frequency estimate computed from temperature and Hall probe estimates using equation (2), and (2) number, duration, and frequency spacing of M measurements, block 1;
2. Acquire the M measurements, block 2;
3. Compute the scale factor array using equation (8), block 3;

4. Compute the error array using equation (9), block 4.

The second part 7a4A of the tuning frequency determination software also has four parts:

1. Compute the shift index using equation (10), block 5;
2. Compute the new Larmor frequency estimate using equation (12), block 6;
3. Is the standard deviation in the Larmor frequency acceptable; if no, return to block 1, otherwise, continue to the next step, block 7;
4. Construct and display the plot in FIG. 8, block 8.

Each of the steps of the first and second parts of the tuning frequency determination software will be discussed in detail in the following paragraphs.

Block 1: Determine measurement frequencies "$fn_1$ and $fn_2$" using equation (3)

The magnetic junk accumulating on on the magnet housings 17 and 20 of the pulsed nuclear magnetism tool shown in FIG. 1 is comprised primarily of iron shavings produced during drilling. The junk perturbs the magnetic field intensity produced at a saddle point in the tool's sensitive region. The magnetic field strength at the saddle point determines the proton Larmor frequency, the Larmor frequency being the radio frequency at which the tool of FIG. 1 must be operated in order to obtain a maximum formation response. Failure to correctly determine the in situ Larmor frequency leads to erroneously low formation porosities.

Note that there are two inputs to block 1:
(1) an initial Larmor frequency estimate computed from temperature and Hall probe estimates using equation (2), and
(2) the number, duration, and frequency spacing of M measurements.

In the absence of the magnetic junk accumulation on the magnet housings, the in situ Larmor frequency can be estimated from temperature and/or Hall probe sensors located in the tool of FIG. 1. However, in the presence of the magnetic junk accumulation on the magnet housings, the aforementioned in situ Larmor frequency estimate is no longer valid. The following paragraphs disclose a means for correcting the aforementioned Larmor frequency estimate to obtain the Larmor frequency in the presence of an unknown mount and distribution of magnetic junk accumulated on the magnet housings 17 and 20.

When the tool of FIG. 1 is disposed in a wellbore, it takes a plurality of measurements. During each measurement, a multitude of echo signals are received by the antenna 18. As noted earlier, echo signals, induced in antenna 18 subsequent to the RF pulse B1, represent a measurement of nuclear magnetic precession and decay within the volume of investigation 19. The multitude of echo signals received by antenna 18 for a particular measurement are summed together thereby producing the results of the particular measurement. A plurality of measurements are taken by the tool of FIG. 1, and each measurement is taken at a different operating frequency.

The Combinable Magnetic Resonance tool of FIG. 1 has "N" discrete, equally spaced operating frequencies "fn", where "fn" is denoted by the following expression:

$$f_n = f_1 + \frac{(f_N - f_1)(n-1)}{N-1}, \quad (1)$$

and where subscripts n=1,2, . . . ,N are called "frequency indices". In the laboratory, measurements at each operating frequency (i.e., the multitude of echo signals associated with each of the N operating frequencies of the tool of FIG. 1) are performed on a water bottle sample and normalized to a maximum value of one. These measurements are made with sufficient repeats so that, by averaging the results, the noise on each measurement can be made negligible. The resulting normalized frequency response of the system is stored in a "master array" denoted as B(i), for i=1,2, . . . ,N, where the array and frequency indices are in one-to-one correspondence (the term "B(i)" being known as the "master response" or the "master array").

Figure 7:
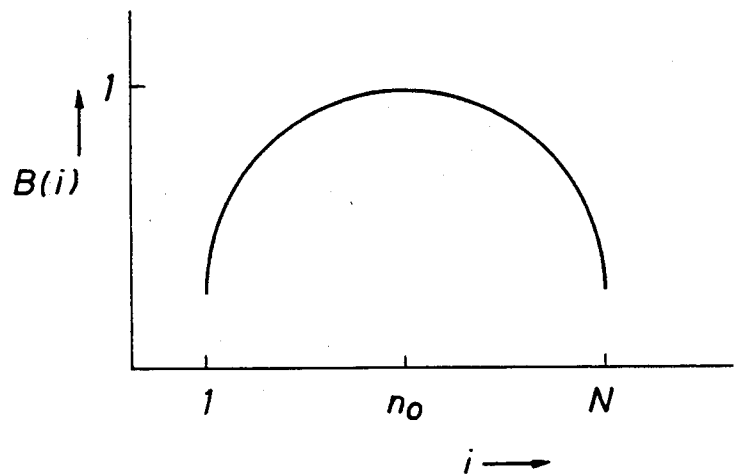
FIG. 7 illustrates the tool master response function measured in the laboratory in the absence of any accumulation of magnetic material on the magnet housings of the tool.

Referring to FIG. 7, a schematic of the "master array" B(i) is illustrated. The master array B(i) of FIG. 7 represents the response of the CMRT tool in the laboratory where there is no accumulation of magnetic material on the magnet housings of the CMRT tool. Note that B(i) in FIG. 7 attains its maximum value for frequency "$fn_0$" which we call the 'Master Array Laboratory Larmor Frequency'. The actual value of "$fn_0$" depends on the temperature at which the laboratory measurements are conducted. The first and second parts of the tuning frequency determination software of FIG. 5, however, is not sensitive to the exact value of "$fn_0$" but only to the shape of the normalized system response function.

However, under actual wellbore conditions, when the CMRT tool is disposed and operating in the wellbore of FIG. 1 and magnetic junk has accumulated on the magnet housings 17 and/or 20, the B(i) frequency response function of FIG. 7 attains its maximum value at a frequency which is shifted away from "$fn_0$", the shift being due primarily to changes in the strength of the magnetic field within the tool's sensitive region caused by temperature changes and/or the accumulation of the magnetic junk on the tool.

In the absence of the magnetic junk accumulation, the in situ Larmor frequency can be estimated from the measured sonde temperature and/or from the Hall probe sensor disposed in the tool of FIG. 1. However, when the Larmor frequency which was estimated from the measured sonde temperature disagrees with the Larmor frequency which was estimated from the Hall probe sensor measurement, this disagreement between Larmor frequency estimates indicates that the sonde of FIG. 1 has accumulated some magnetic junk on the magnet housings 17 and 20. The magnitude of this disagreement has been shown to be linearly proportional to the amount of permeable material attached to the magnet cases 17 and 20. The actual Larmor frequency depends beth upon the amount of magnetic junk accumulated on the magnet housings and on how the junk is distributed on the magnet housings. However, using an empirically based rule, we can obtain an initial estimate "$fn_c$" of the 'in situ' Larmor frequency, from the following expression:

$$f_{nc} = f_r + 0.35(f_r - f_H) \quad (2)$$

where $f_T$ is the Larmor frequency estimated from the sonde temperature and $f_H$ is the Larmor frequency estimated from the Hall probe measurement inside the sonde housing.

A correction to the initial estimate can be computed from a few (compared to N) measurements made at "M" equally spaced frequencies. Here it is required that "M" be much less than "N" so that the Larmor frequency determination can be made rapidly. The algorithm associated with the tuning frequency determination software of the present invention is based on the assumption that the in situ frequency responses denoted by the array A(i), for i=1,2, . . . ,M are identical to the master array responses B(i) except for a shift in frequency (and a scale change which preserves the shape of the master response).

Since magnetic junk has accumulated on the magnet housings, the B(i) frequency response function of the tool of FIG. 1 has its maximum value at a frequency which has shifted away from the "$f_{n_0}$" center frequency. As a result, it is necessary to calibrate the tool prior to performing any substantive measurements in the wellbore. To calibrate the tool, one must determine a new Larmor frequency and then tune the tool of FIG. 1 to the new Larmor (tuning) frequency.

Accordingly, in order to calibrate the tool, one must do the following.

At a particular station in the wellbore, for each of "M" equally spaced frequencies (where "M" is an odd number), a measurement is made.

Therefore, since there are "M" frequencies, there are "M" measurements, one for each frequency. However, for each such measurement, a plurality of spin echo signals are received, accumulated, and stacked. These "M" frequencies are symmetrically spaced, in the closed interval from $f_{n_1}$ to $f_{n_2}$, about the initial estimate of the Larmor frequency "$f_{n_c}$" with spacing "delta f" as follows:

$$f_{n1} = f_{nc} - \frac{\Delta f(M-1)}{2} \tag{3}$$

$$f_{n2} = f_{nc} + \frac{\Delta f(M-1)}{2}$$

where "delta f" is the frequency spacing of the measurements.

Block 2: Acquire the M measurements

Assume that, for each of the "M" equally spaced frequencies, one measurement is made; however, each measurement involves the receipt of an identical number "J" of spin echo signals. If a plurality of measurements are made for each frequency, further assume that the same number of measurements are stacked for each frequency. Each of these measurements are denoted by the array A(j), where j=1,2, . . . ,M. The A(j) are defined by, $$A(j) = \sum_{k=1}^{J} A_k^{(+)}(j), \tag{4}$$

where $A_k^{(+)}(j)$ is the amplitude of the k-th spin echo for frequency index j.

Block 3: Compute the scale factor array "$c_s$" using equation (8)

Now that all of the "M" measurements for the corresponding "M" frequencies are acquired, for a particular station in a borehole, the measurement data is utilized to compute the Larmor frequency. When the new Larmor frequency is determined, the tool of FIG. 1 is tuned to new Larmor frequency thereby accounting for the magnetic junk accumulating on the magnet housing 17 and 20 of the tool.

The in-situ measurements A(j) can be related to the master response B(i) by the equation:

$$A(j) = cB((j-1)\Delta n + s) + N(j), \tag{5}$$

where c is an unknown scale factor that depends on temperature and porosity. The shift parameter index "s" assumes integer values in a range where "s" is greater than or equal to 1 and less than or equal to $(N-(n_2-n_1))$. The indices $n_2$ and $n_1$ can be computed from equation (1) using equation (3). Note that the shift parameter "s" is defined so that the shift is relative to $n_1$, that is, the shift is $(s-n_1)$. In equation (5), the array spacing "delta n" is related to the frequency spacing "delta f" of the measurements by the following equation:

$$\Delta n = \frac{(N-1)\Delta f}{(f_N - f_1)}. \tag{6}$$

The noise "N(j)" in equation (5) is zero mean Gaussian with variance equal to $\Psi J$, where "$\Psi$" is the noise variance on a single echo.

Maximum liklihood estimates of the shift parameter "s" and scale factor "c" that best fit the in situ measurements are obtained by simultaneous minimization of the squared error, $$G(c, s) = \sum_{j=1}^{M} (A(j) - cB((j-1)\Delta n + s))^2, \tag{7}$$

with respect to c and s. Requiring that the derivative of equation (7) with respect to c vanish leads to the following estimate of the scale factor $c_s$ in equation (8):

$$\hat{c}_s = \frac{\sum_{j=1}^{M} A(j)B((j-1)\Delta n + s)}{\sum_{j=1}^{M} B^2((j-1)\Delta n + s)}. \tag{8}$$

Note that the scale factor $c_s$ depends on the shift parameter s.

Block 4: Compute the error array "$G_s'(c_s,s)$" using equation (9)

The derivative of equation (7) with respect to the shift parameter "s" is given by the following equation (9), which defines the error array "$G_s'(c_s,s)$":

$$G_s'(\hat{c}_s, s) = -2\hat{c}_s \sum_{j=1}^{M} (A(j) - \hat{c}_s B((j-1)\Delta n + s)) \cdot \tag{9}$$

$$B'((j-1)\Delta n + s),$$

where we have used equation (8) and defined the derivative B'(i) of the master array response. In equation (9), the dot (.) denotes ordinary scalar multiplication.

Block 5: Compute the shift index "s" using equation (10)

The error array "$G_s'(c_s,s)$" from equation (9) was computed in the dovehole computer 46 of FIG. 3. The downhole computer 46 now transmits the error array "$G_s'(\hat{c}_s, s)$" uphole to the surface apparatus processing system 7a of FIG. 1 located at the surface of the wellbore. The surface processing system 7a begins by computing the shift index "s" from the following equation (10). The maximum liklihood estimate of the shift parameter "$\hat{s}$" is obtained from equations (8) and (9) by the following equation (10):

$$\hat{s} = \underset{1 \leq s \leq s_{max}}{\text{argmin}} \{|G_s'(\hat{c}_s, s)|\}, \quad (10)$$

where the bars denote absolute value and $s_{max} = N - (n_2 - n_1)$. In equation (10), the symbol argmin {} denotes the argument that minimizes the function in braces.

Block 6: Compute the new Larmor frequency estimate "$f_L$" using equation (12)

The corrected in situ Larmor frequency index estimate "$(\hat{n}_L)_{corr}$" is simply given by equation (11) as follows:

$$(\hat{n}_L)_{corr} = n_0 - (\hat{s} - n_1). \quad (11)$$

If we denote the corrected Larmor frequency by "$f_L$", then the corrected Larmor frequency is given by the following equation (12), as follows:

$$\hat{f}_L = f_{n_0 + (\hat{i} - n_1)} \equiv f_{n_0} - \frac{(f_N - f_1)}{N - 1}(\hat{s} - n_1). \quad (12)$$

where the last equality follows from equations (1), (3), and (6). In equation (12), $\hat{f}_L$ is the new Larmor frequency which will be used to tune or calibrate the CMRT tool of FIG. 1; $f_{n_0}$ is the Larmor frequency of the master array B(i) (recall that the master array B(i) is the response of the tool of FIG. 1 without the accumulation of magnetic material on the magnet housings and it achieves it maximum value at frequency $f_{n_0}$); and the last term "$[(f_N-f_1)/(N-1)][(\hat{s}-n_1)]$" represents the amount by which the maximum value of the master response function B(i) has shifted away from "$f_{n_0}$" due to the accumulation of magnetic junk on the magnet housings 17 and/or 20 in FIG. 1.

In equation (12), $f_N$ is the highest operating frequency (recall that there are N operating frequencies); $f_1$ is the lowest operating frequency; N is the number of operating frequencies; $\hat{s}$ is determined from equation (10); and $n_1$ is the frequency index associated with the lowest of the "M" measurements (recall that, in the A(i) response, $f_{n_1}$ is the lowest frequency, $f_{n_2}$ is the highest frequency, and $f_{n_c}$ is the center frequency determined from equation (2)).

Block 7: Is the standard deviation in the Larmor frequency acceptable?

The variance in the estimate of the 'in situ' Larmor frequency index is given by equation (13) as follows:

$$\sigma^2((\hat{n}_L)_{corr}) = \frac{J\hat{\psi} M_{22}}{M_{11}M_{22} - M_{12}^2}, \quad (13)$$

where we have defined the sums, $$M_{11} = \hat{c}_s^2 \sum_{j=1}^{M} [B'((j-1)\Delta n + \hat{s})]^2, \quad (14)$$

$$M_{22} = \sum_{j=1}^{M} [B((j-1)\Delta n + \hat{s})]^2, \quad (15)$$

$$M_{12} = \hat{c}_s \sum_{j=1}^{M} [B((j-1)\Delta n + \hat{s})] \cdot [B'((j-1)\Delta n + \hat{s})], \quad (16)$$

where "$J\hat{\psi}$" is the variance in the station measurement A(j) and is given by equation (17) as follows:

$$J\hat{\psi} = \sum_{j=1}^{J} (A_j^{(-)})^2, \quad (17)$$

where the $A_{j_b}^{(-)}$ is computed from the borehole station measurement data. Using equations (1) and (6), the standard deviation in the estimated Larmor frequency is found by equation (18) as follows:

$$\sigma(\hat{f}_L) = \left(\frac{f_N - f_1}{N - 1}\right) \sigma((\hat{n}_L)_{corr}). \quad (18)$$

Note that the variance of the Larmor frequency estimate depends on the number "M" and the frequency spacing "delta f" of the station measurements. Therefore, equation (18) can be used to study the dependence of the variance in the Larmor frequency estimate on M and delta f. If the variance in the Larmor frequency estimate exceeds a prescribed tolerance, it might be necessary to further reduce the noise on each echo by increasing the measurement period for each frequency.

Block 8: Construct and Display the Plot in FIG. 8

Figure 8:
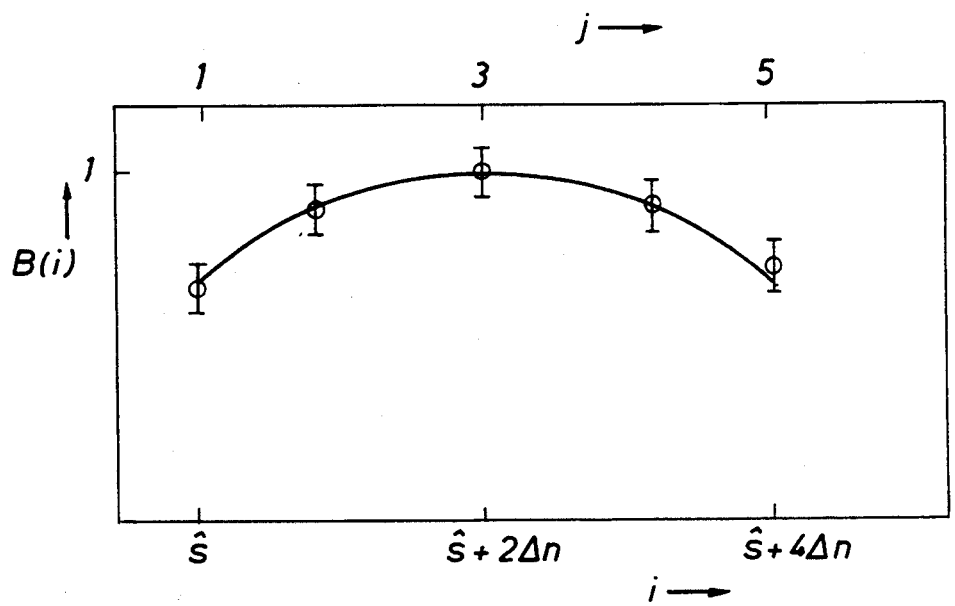
FIG. 8 illustrates a post processing plot showing the goodness of fit of the measurement described in this specification relative to the tool master response function of FIG. 7.

Referring to FIG. 8, a schematic of an example of a useful post processing plot, for M=5 measurements, is illustrated. This plot graphically illustrates the goodness of the fit of the measurements (normalized by the optimum scale factor) relative to the master response B(i) which is shown in FIG. 7. The error bars in FIG. 8 are the standard deviations in the scaled measurements. In this plot, note that the frequency index of the central point on the lower abscissa is the frequency index of the estimated Larmor frequency ($\hat{f}_L$).

To compute the standard deviations in the scaled measurements, one must compute the error bars in FIG. 8. For the purpose of deriving an approximation to the variance in the scaled measurements, let, $$\overline{A}(k) = A(k)/\hat{c}_s \quad (19)$$

denote the scaled measurements plotted in FIG. 2 for k=1,2,...,M. Note that "$\overline{A}(k)$" of equation (19) is the ratio of two random variables since the scale factor depends on the measurements. An approximation to the variance in "$\overline{A}(k)$" can be derived. One finds that, $$\sigma^2(\hat{\overline{A}}(k)) \approx \left(\frac{\partial \hat{\overline{A}}(k)}{\partial A(k)}\right)^2 \sigma^2(A(k)) + \left(\frac{\partial \hat{\overline{A}}(k)}{\partial \hat{c}_s}\right)^2 \sigma^2(\hat{c}_s) + \quad (20)$$

$$2\left(\frac{\partial \hat{\overline{A}}(k)}{\partial A(k)}\right)\left(\frac{\partial \hat{\overline{A}}(k)}{\partial \hat{c}_s}\right)<\delta A(k)\delta \hat{c}_s>.$$

In equation (20), we have defined the fluctuations of the random variables about their expectation values, i.e., $\delta A(k) = A(k) - \langle A(k) \rangle$, etc, where the angular brackets are used to denote statistical averages. The last term in equation (20) accounts for the correlation between the random variables. In deriving equation (20), the higher order fluctuation terms have been dropped, which are assumed to be negligible. Performing the calculations indicated in equation (20), one finds the desired result, $$\sigma(\hat{A}(k)) \approx \frac{\sqrt{\hat{\psi} J}}{\hat{c}_s} \left[ 1 + \frac{\hat{A}^2(k)}{\sum_{j=1}^{M} B^2((j-1)\Delta n + \hat{s})} - \frac{\hat{A}(k)B((k-1)\Delta n + \hat{s})}{\sum_{j=1}^{M} B^2((j-1)\Delta n + \hat{s})} \right]^{\frac{1}{2}}, \quad (21)$$

where we have made use of the following statistical averages, $$\delta A(k) \, \delta A(l) = \delta_{k,l} \hat{\gamma} J, \quad (22)$$

and $$\langle \delta A(k) \delta \hat{c}_s \rangle = \frac{\hat{\psi} J B((k-1)\Delta n + \hat{s})}{\sum_{j=1}^{M} B^2((j-1)\Delta n + \hat{s})}. \quad (23)$$

Note that, if $c_s$ were not random, the second and third terms in brackets in (21) would not be present and (21) would reduce, as expected, to the standard deviation in $A(k)$ divided by the scale factor. If we failed to account for the correlations between the scale factor and the measurements, the error bars in FIG. 8 would be overestimated. It is possible that, as the bandwidth of the antenna increases with temperature, the overall response function described by the master array will broaden. It is obvious that the response function temperature broadening could be incorporated into the master array in a modified version of the algorithm.

Figure 9:
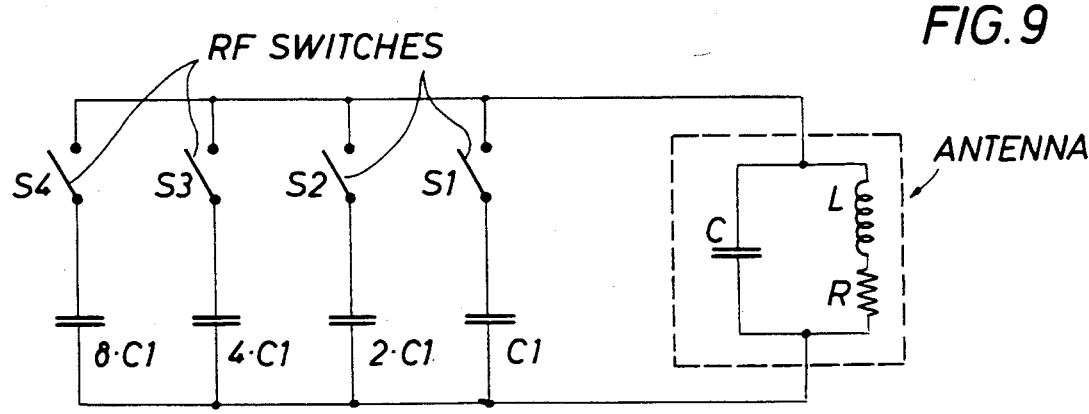
FIG. 9 illustrates an antenna circuit, disposed within each of the antennas of the CMRT tool of FIG. 1, having an effective capacitance, the antenna circuit being tuned to the new Larmor frequency when the effective capacitance of the circuit is adjusted.

Referring to FIG. 9, a circuit is illustrated. This circuit is disposed within each of the antennas 18 and 21 of FIG. 1.

The circuit of FIG. 9 (hereinafter called an "antenna circuit") includes a plurality of RF switches S1, S2, S3, and S4, each of which is disposed in series with one of 4 binary-weighted capacitors: C1, 2C1, 4C1 and 8C1. The resultant four series connected Rf switches and associated capacitors are connected in parallel with each other, as shown in FIG. 9, and are further connected in parallel with the physical antenna, whose equivalent circuit is shown with an inductance "L", a resistance "R", and a capacitance "C". This circuit allows the antenna circuit effective capacitance to be varied in increments of C1 from (0+C1) to (15C1+C) as the binary-weighted value of the switch states are changed:

| | | Switch States | | |
|---|---|---|---|---|
| S4 | S3 | S2 | S1 | Effective Capacitance |
| 0 | 0 | 0 | 0 | 0 + C |
| 0 | 0 | 0 | 1 | C1 + C |
| 0 | 0 | 1 | 0 | 2C1 + C |
| 0 | 0 | 1 | 1 | 3C1 + C |
| . | | | | |
| . | | | | |
| 1 | 1 | 1 | 1 | 15C1 + C |

The new Larmor frequency $\hat{f}_L$ is determined by equation (12) above. When the new Larmor frequency $\hat{f}_L$ is determined, in order to tune the NMR logging system of FIG. 1 to this new frequency, one must do the following:

1. Determine a new effective capacitance "$C_{new}$" for each antenna circuit disposed within each antenna 18 and 21 of FIG. 1 from the new Larmor frequency $\hat{f}_L$, by using the following equation:

$$C_{new} = [1/L][1/(2 \pi \hat{f}_L)]^2, \text{ where pi} = 3.1416... \quad (24)$$

2. When the new effective capacitance $C_{new}$ is determined, the switch settings to effect this new capacitance can be calculated as follows:

$$\text{Setting} = \text{INTEGER}[(C_{new} - C)/C1] \quad (25)$$

The binary (or base 2) value of the value "Setting" determines the new switch states (on or off). For instance, if "Setting" is determined to be 11, or binary 1011, then the switch states would be the following

| S4 | S3 | S2 | S1 |
|---|---|---|---|
| 1 | 0 | 1 | 1 |
| on | off | on | on |

In summary, close or open one or more of the RF Switches S1, S2, S3, S4 in FIG. 9 until the old effective capacitance "$C_{old}$" of the antenna circuit of FIG. 9 is equal to the new effective capacitance "$C_{new}$" determined from equation (24) above. When $C_{old} = C_{new}$ for each antenna circuit disposed within each antenna 18 and 21 of FIG. 1, the NMR logging system of FIG. 1 is now tuned to the new Larmor frequency, and the accumulation of magnetic material on the magnet housings of the tool of FIG. 1 has been taken into account.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of calibrating a well tool having a magnet housing when said well tool is disposed in a wellbore to compensate for accumulation of material on said magnet housing of said well tool, said well tool having an antenna, said antenna including an antenna circuit, said antenna circuit having an effective capacitance, said antenna circuit of said well tool being originally tuned to an old tuning frequency, comprising the steps of:

(a) receiving a plurality of sets of input signals into said antenna of said well tool when said well tool is disposed in said wellbore;

(b) determining a new tuning frequency from said plurality of sets of input signals, said new tuning frequency being a new Larmor tuning frequency, said new Larmor tuning frequency being a frequency which takes into account said accumulation of material on said magnet housing of said well tool; and (c) adjusting the effective capacitance of said antenna circuit in said well tool until said old tuning frequency of said antenna circuit of said well tool is changed to said new Larmor tuning frequency of said well tool.

2. The method of claim 1, wherein said well tool is electrically connected to a surface apparatus disposed at a surface of said wellbore when said well tool is disposed in said wellbore, the determining step (b) including the steps of:

(d) in said well tool, processing said plurality of sets of input signals to determine a first value; and (e) in said surface apparatus, processing said value to determine said new tuning frequency.

3. The method of claim 2, wherein said well tool has N operating frequencies, the receiving step (a) including the step of:

(f) receiving M sets of input signals into said antenna of said well tool when said well tool is disposed in said wellbore, where $M<N$.

4. The method of claim 3, wherein said antenna circuit includes a plurality of RF switches, the adjusting step (c) including the step of:

(g) opening or closing one or more of said RF switches, the opening or closing of said RF switches adjusting the effective capacitance of said antenna circuit in said well tool, the effective capacitance being adjusted until said old tuning frequency of said well tool is approximately equal to said new tuning frequency of said well tool.

5. The method of claim 2, wherein the processing step (d) comprises the steps of:

(h) in addition to said plurality of sets of input signals, receiving an initial estimate of said new tuning frequency;

(i) receiving a number, a duration, and a frequency spacing of plurality of sets of input signals; and (j) computing an error array in response to the receiving step (a), the receiving step (h) and the receiving step (i), said first value being said error array.

6. The method of claim 5, wherein the processing step (e) comprises the step of:

(k) determining said new tuning frequency from said error array.

7. The method of claim 6, wherein said well tool has N operating frequencies, the receiving step (a) including the step of:

(f) receiving M sets of input signals into said antenna of said well tool when said well tool is disposed in said wellbore, where $M<N$.

8. The method of claim 7, wherein said antenna circuit includes a plurality of switches, the adjusting step (c) including the step of:

(g) opening or closing one or more of said switches, the opening or dosing of said switches adjusting the effective capacitance of said antenna circuit in said well tool, the effective capacitance being adjusted until said old tuning frequency of said well tool is approximately equal to said new tuning frequency of said well tool.

9. In a logging system including a well tool having a receiver with an effective capacitance and a magnet housing adapted to be disposed in a wellbore and a surface apparatus electrically connected to said well tool adapted to be disposed at a surface of said wellbore, a calibration apparatus adapted to compensate for an accumulation of material on said magnet housing of said well tool, comprising:

first means disposed in said well tool for receiving a plurality of sets of input signals from a formation traversed by said wellbore, said first means further receiving an initial estimate of a tuning frequency and other data including a number, duration, and frequency spacing of said plurality of sets of input signals;

second means disposed within said well tool and responsive to said input signals, said initial estimate of said tuning frequency, and said other data for generating an error array; third means disposed within said surface apparatus and responsive to said error array for determining a new tuning frequency for said well tool corresponding to a new effective capacitance of said receiver, said new tuning frequency being a new Larmor tuning frequency, said new Larmor tuning frequency being a frequency which takes into account said accumulation of material on said magnet housing of said well tool; and adjustable means disposed within said receiver and originally having a old effective capacitance corresponding to an old tuning frequency of said well tool for changing said old effective capacitance to said new effective capacitance, said old tuning frequency of said well tool being changed to said new Larmor tuning frequency of said well tool when said old effective capacitance of said receiver is changed to said new effective capacitance, the calibration apparatus compensating for the accumulation of said material on said magnet housing of said well tool when said old tuning frequency of said well tool is changed to said new Larmor tuning frequency.

10. In the logging system of claim 9, wherein said well tool has "N" operating frequencies, and wherein the number of said plurality of sets of input signals received by said first means is "M" sets, where $M<N$.

11. In the logging system of claim 10, wherein said adjustable means comprises a plurality of parallel connected switches collectively disposed in parallel with an LRC circuit, said switches having a closure condition, said adjustable means changing said old effective capacitance of said receiver to said new effective capacitance when the closure condition of one or more of said switches is changed.

12. In the logging system of claim 10, wherein said first means determines "M" sets of measurement frequencies associated, respectively, with the "M" sets of input signals prior to receiving said "M" sets of input signals from said formation traversed by said wellbore.

13. In the logging system of claim 12, wherein said second means generates a scale factor from said "M" sets of input signals, said initial estimate of said tuning frequency, and said other data, said second means generating said error array from said scale factor.

14. In the logging system of claim 13, wherein said third means determines a shift index from said error array, said third means determining said new tuning frequency from said shift index.

15. In the logging system of claim 14, wherein said adjustable means comprises a plurality of parallel connected switches collectively disposed in parallel with an LRC circuit, said switches having a closure condition, said adjustable means changing said old effective capacitance of said receiver to said new effective capacitance when the closure condition of one or more of said switches is changed.

16. In the logging system of claim 14, wherein said calibration apparatus further comprises:
   fourth means responsive to said new tuning frequency determined by said third means for determining if a standard deviation in said new tuning frequency acceptable and for generating a post processing output record medium illustrating a goodness of fit of said "M" sets of input signals relative to a master response output record when the standard deviation in said new tuning frequency is acceptable, said master response output record being representative of a response of said well tool when there is no accumulation of said material on said magnet housing of said well tool.

17. In the logging system of claim 16, wherein said first means receives a new set of said other data when the standard deviation in said new tuning frequency is not acceptable.

18. In the logging system of claim 17, wherein said adjustable means comprises a plurality of parallel connected switches collectively disposed in parallel with an LRC circuit, said switches having a closure condition, said adjustable means changing said old effective capacitance of said receiver to said new effective capacitance when the closure condition of one or more of said switches is changed.

19. In a system including a surface system and a subsurface system adapted to be disposed in a wellbore, the subsurface system including a receiver, an effective capacitance setting means in said receiver for adjustably setting an effective capacitance representative of a tuning frequency of said receiver, and a magnet housing adapted to attract and accumulate material thereon when said subsurface system is disposed in said wellbore, a tuning frequency determination apparatus adapted for determining a Larmor frequency and tuning said receiver to said Larmor frequency to compensate for the accumulation of said material on said magnet housing of said subsurface system, comprising:
   first means disposed in said subsurface system for receiving a plurality of signals from a formation penetrated by said wellbore and generating an error array in response thereto;
   second means disposed in said surface system responsive to said error array for determining said Larmor frequency, said Larmor frequency being a frequency which takes into account said accumulation of said material on said magnet housing, said Larmor frequency corresponding to a new effective capacitance,
   said effective capacitance setting means being set to said new effective capacitance representative of said Larmor frequency, said receiver being tuned to said Larmor frequency when said effective capacitance setting means is set to said new effective capacitance, said subsurface system compensating for said accumulation of said material on said magnet housing when said tuning frequency determination apparatus determines said Larmor frequency and said receiver is tuned to said Larmor frequency.

20. In the system of claim 19, wherein said first means receives an initial estimate of a tuning frequency and other data including a number, duration, and frequency spacing of said plurality of signals, said second means generating said error array in response to said plurality of signals, said initial estimate of said tuning frequency, and said other data.

21. A method of tuning a well tool when said well tool is disposed in a wellbore and a plurality of material accumulates on a magnet housing of said well tool to compensate for said material accumulating on said magnet housing, said well tool including said magnet housing and a receiver, said receiver including an effective capacitance setting apparatus, comprising the steps of:
   determining a new Larmor frequency when said well tool is disposed in said wellbore and said material accumulates on said magnet housing;
   determining a new effective capacitance from said new Larmor frequency; and
   adjusting said effective capacitance setting apparatus to reflect said new effective capacitance, said well tool being tuned to compensate for said material accumulating on said magnet housing when said effective capacitance setting apparatus is adjusted to reflect said new effective capacitance representative of said new Larmor frequency.

22. A logging system, comprising:
   a subsurface system adapted to be disposed in a wellbore including a magnet housing and a receiver, said magnet housing adapted to attract a plurality of material when said subsurface system is disposed in said wellbore, said material accumulating on said magnet housing when attracted thereto;
   means for determining a new Larmor frequency when said subsurface system is disposed in said wellbore and said material accumulates on said magnet housing of said subsurface system, said new Larmor frequency corresponding to a new effective capacitance; and
   effective capacitance setting means disposed in said receiver for adjustably setting therein an effective capacitance, said effective capacitance setting means being set to said new effective capacitance representative of said new Larmor frequency when said means for determining determines said new Larmor frequency,
   said subsurface system being tuned to compensate for said material accumulating on said magnet housing when said effective capacitance setting means is set to said new effective capacitance.

* * * * *